Aug. 26, 1930.  H. E. BURNS  1,774,081
SELF LOCKING NUT
Filed March 6, 1929

Inventor
Harley E. Burns
By
Hubert E. Peele, Attorney

Patented Aug. 26, 1930

1,774,081

UNITED STATES PATENT OFFICE

HARLEY E. BURNS, OF CHICAGO, ILLINOIS

SELF-LOCKING NUT

Application filed March 6, 1929. Serial No. 344,744.

This invention relates to a self locking nut that possesses the holding power and strength against stripping required of a standard nut of approximately corresponding dimensions, and that in addition possesses the inherent capacity of deforming to tightly grip and automatically become locked to its bolt, by the continued sliding abutment of the nut on a hard opposing seating surface under the nut rotating power driving the nut to its final seating against said surface; and the object and nature of the invention will be understood by those skilled in the art in the light of the following explanations of the accompanying drawings that illustrate what I now believe to be the preferred mechanical expression or embodiment of my invention from among other formations and qualities within the spirit and scope thereof.

An object of the invention is to provide a self locking nut of maximum strength and holding power against stripping to perform the holding and nut functions of an ordinary nut of approximately like size and dimensions, and that in addition will possess improved characteristics in the matters of formation, great tensile strength, and peculiar ductile characteristics, whereby the nut will automatically grip and lock itself to its bolt under the rotative power that forces the nut to its final seat against the adjacent abutting hard opposing surface, while reducing to the minimum resulting exterior deformation or inclination of the nut flats or wrench faces.

With the foregoing and other objects in view, my invention consists in a self locking nut of peculiar formation and characteristics, as more fully and particularly described and specified hereinafter.

Referring to the accompanying drawings, forming a part hereof:

The screw threaded nuts of commerce, in this country, except possibly for some special uses, are made according to either one of two recognized standard dimensions, namely; "United States standard", and "Manufacturer's standard", and the bolt hole diameter and screw threads for each size nut are standardized, as well as the tests for strength against splitting or fracture, and holding power against thread stripping, and the nut of my invention disclosed hereby, is designed for production in sizes according to the foregoing standards with the strength and holding power required of such standards, and in addition to said full strength requirements my nut of this invention possesses the capacity of automatically locking on its bolt, as hereinafter set forth, with a resulting minimum deformation of the angle or position of the nut flats, with a minimum final application of rotative power to drive the nut to its final seat, and with the locked nut still capable of being backed or unscrewed from its bolt and of being again screwed up thereon by application of the necessary rotative force.

Whether the nut is square, hexagonal, or of other exterior form, it is shaped for self locking, and is also exteriorly shaped to receive and hold a tool or implement for rotating the nut on its bolt to screw the same thereon or unscrew the same therefrom. In the examples shown, each nut is exteriorly formed with flats or wrench faces a, and it is desirable to maintain these flats a, parallel with the axis of the nut bolt hole and against such inclination toward the bolt hole as may tend to cause the wrench or other nut rotating tool to slip from the nut.

The central bolt hole c, extends longitudinally through the nut, and the surrounding wall of the bolt hole is tapped to provide a screw thread i, that is continuous throughout the length of the bolt hole, except where interrupted or mutilated as hereinafter pointed out, to receive and but loosely or partially mesh with the corresponding longitudinal screw thread 2, of an appropriate bolt 1, to which the particular nut is adapted.

The nut of my invention, in its original form before deformation for self locking, has its bolt hole diameter so proportioned and its thread i, so cut with respect to the thread and diameter of the bolt to which adapted, that the nut can be freely spun or rotated as by the fingers, or light pressure of a rotating tool, on the bolt to quickly screw the nut thereon to the loose initial engagement of the nut back or inner end with the hard surface or abutment 3, through which the bolt passes and against which the nut is to be ultimately forced to its final seat. A certain advantage as well as saving of time thus results, as the nuts can be quickly and without serious effort, spun on the bolts up to the position where final seating and locking rotation force must be applied thereto.

Figure 1:
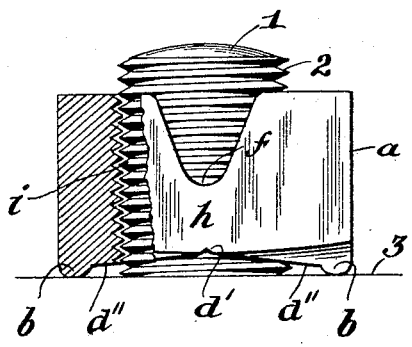
Fig. 1 is a sectional elevation showing an embodiment of a self locking nut of my invention of standard size, screwed on an appropriate bolt to loose initial contact with an adjacent hard abutment or surface, the nut being shown in its original form and not locked to but loose on its bolt, the partial or loose intermesh of the nut and bolt screw thread being exaggerated.

In Fig. 1 of the drawings I have in an exaggerated manner, illustrated this loose or partial intermesh of the nut and bolt threads, which in practice is only about 60%, as distinguished from the full tight 100% locking intermesh between the bolt and the nut throughout a portion of its length, after the self locking nut deformation has been effected.

The self-locking feature of my invention provides a diametrical bending line whereby under certain pressure and resulting forces directed along certain lines, the nut flexes or bends to a permanent deformation in which the nut and bolt threads intermesh from 90% to 100% and tightly grip the nut to the bolt against accidental loosening relative unscrewing movements, throughout at least a portion of the nut length. However, this permanent deformation of the nut does not objectionably change the angles of the nut flats as to render uncertain and insecure the grip of a rotating tool on the nut, nor does such deformation of the nut damage the nut and bolt and the screws thereof in effecting the tight locking of these parts together against accidental unscrewing or objectionable loosening movements, as the nut remains free to be unscrewed from and again screwed on the bolt but only through the application of the necessary power and force applied through the medium of an appropriate wrench or other tool.

In the example disclosed, this bending line or portion is established by what approximately amounts to partially dividing the nut longitudinally and centrally into two longitudinal opposed sections or what might be termed halves that are joined or connected together adjacent to the inner end or back of the nut by an unbroken annular or ring portion of the nut that embodies two diametrical opposite relatively thin hot forged ductile portions h, of great tensile strength and capable of flexing to permanent form under properly applied pressure of the necessary power.

In this example, the nut is formed to provide this bending line by a comparatively deep narrow straight V-groove f, extending diametrically across the crown or outer end of the nut and at its outer longitudinal side opening through and centrally intersecting the flat outer or crown end face of the nut, and by a wide shallow V groove d, extending centrally or diametrically completely across the back or inner end of the nut with its longitudinal axis parallel with the longitudinal axis of the top groove f.

The groove f opens through diametrically opposite sides of the bolt hole c, and consequently to that extent interrupts and reduces the effective total area or length of the nut screw thread i, and hence the cross sectional dimensions of the grooves are such as to maintain to the maximum the effective total area of the screw thread while also attaining the maximum tensile strength and desired flexing or deforming capacity of the nut. The groove f. is rounded or curved at the floor or bottom while as narrow as possible and approximately V shape. The hollowed back or inner end of the nut formed by the shallow wide groove d, provides a diametrical central apex line d', centrally arranged under and parallel with the floor of top groove f, and two flat outwardly and downwardly converging similar faces d'', that extend from the central line d'. to the straight parallel depending usually transversely rounded bearing ribs b, respectively, that are parallel with and at their outer sides merge into the diametrically opposite flats, a, that are parallel with groove f, and line d', and that extend throughout the full longitudinal length of the nut. It will also be noted that the plane longitudinally of the nut in which line d'. is located passes centrally through the narrow floor of groove f, and includes the longitudinal axis of said groove, and is parallel with and located centrally between the respective planes of the rounded bearing ribs b. and just mentioned flats a.

The corner portions $d^3$ of the back or inner end of the nut are rounded off or chamfered to round or bevel off the opposite ends of the two depending bearing ribs $b$, to eliminate from the nut back or inner end sharp corners or angles likely to bite into the adjacent seating surface 3, and to form the bottom surfaces of the ribs to easily or smoothly ride and slide on the surface 3.

Figure 2:
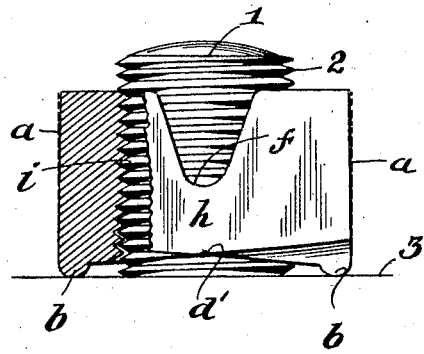
Fig. 2 is a sectional elevation showing the nut and bolt of Fig. 1 after the nut has been automatically locked to the bolt by the deformation of the nut resulting from its forceful sliding contact with said abutment under the rotating power that screws the nut down on the bolt to the final nut seating against said abutment.
Figure 3:
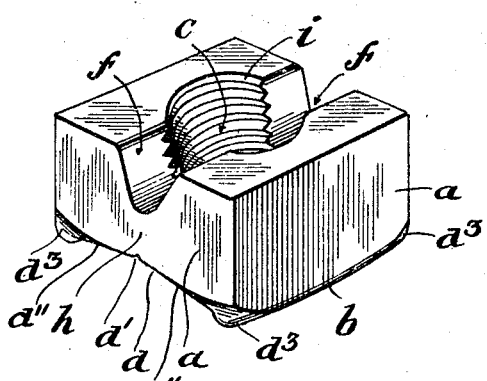
Fig. 3 is a top perspective of the nut of Fig. 1.
Figure 4:
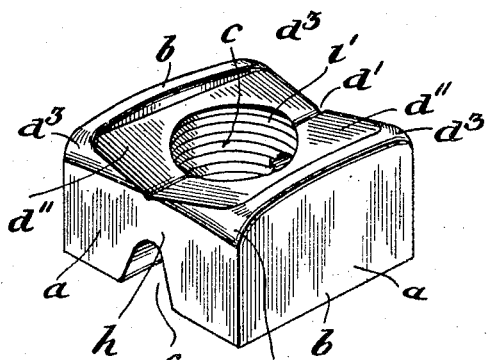
Fig. 4 is a bottom perspective of the nut of Fig. 1.
Figure 5:
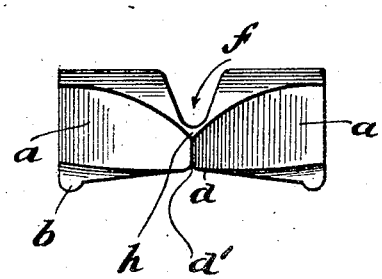
Fig. 5 is an edge elevation of a hexagonal nut embodying my invention.

The nut is composed of metal possessing peculiar strength and characteristics by reason of which at least the outer or crown portions of the nut at diametrically opposite sides of groove $f$, are forced radially toward each other to, in effect, clamp the bolt between them and thus lock the nut thereto, by the riding abutment of the widely spaced abutment ribs $b$, against surface 3, while the final screwing up rotation of the nut is forced by the required wrench or tool pressure, after the initial loose contact shown by Fig. 1, to the final seating shown by Fig. 2, in which position the locking of the nut to the bolt against loosening by vibration has been completed.

Figure 6:
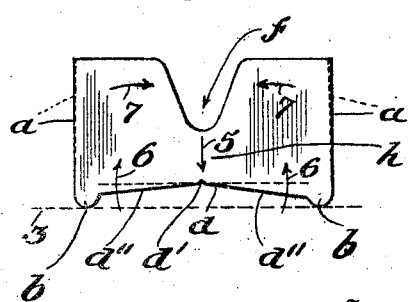
Fig. 6 is a diagram of the nut to illustrate the direction of metal movement whereby the bolt clamping action takes place with a minimum resulting deformation of the flats or wrench faces of the nut.

During this final forcing of the nut to its ultimate tight seating abutment against surface 3, (Fig. 2) the rounded bottom surfaces of widely separated ribs $b$, ride and possibly rock on the surface 3, while the central portion of the nut is drawn toward surface 3, by the action of the screw threads and consequently the flat diverging faces $d''$, tend to flatten out as the apex $d''$, is drawn toward surface 3 (as I have endeavored to more or less diagrammatically illustrate by Fig. 6) in the direction of arrow 5, so that said faces $d''$, in effect swing on line $d'$, as an approximate center to the approximate positions shown by dotted lines, and the two approximate halves of the nut approximately swing on line $d'$, in the direction of the curved arrows 6 and the outer end portions of said nut halves move radially toward each other in the direction of the radial arrows 7.

This nut bending or deforming action is accomplished without flattening out or upsetting said ribs, and without substantially increasing the distance diametrically of the nut between the inner end portions of the two flats $a$, (Fig. 6) or substantially decreasing the distance between the outer end portions of said flats, and hence without objectionably inclining said flats or causing them to objectionably converge toward the outer or crown end of side of the nut to such an extent as to afford the wrench or other nut rotating tool an uncertain or insecure grip or hold on the nut.

This peculiar action, without upsetting or flattening out and spreading the back or inner end of the nut against and into approximate complete contact with surface 3, is rendered possible by the provision of the bearing ribs $b$, and the peculiar nut formation and ductile and tensile strength characteristics which require the nut to bend or flex toward surface 3, at the relatively thin portions $h$, approximately on the diametrical line $d'$, virtually on ribs $b$, $b$, as fulcrums.

The metal of the nut is of such characteristics, that the nut form is thus changed to a permanent bolt clamping formation, without spring or elastic characteristics puting the deformed nut under tension tending to return to its original form. In other words, the metal of the nut possesses ductile characteristics with a tendency to remain at rest in the form and condition to which reshaped. However, the nut of my invention is composed of metal of such characteristics, as to retain its toughened and great holding strength and power against stripping, when thus deformed by its contraction onto and clamping of the bolt, to supply the deficiency in holding power otherwise existing therein by reason of the interruption of the screw threads by groove $f$, and thus enable the locked nut to meet stripping test requirements of standard nuts of corresponding dimensions.

The self-locking nut disclosed, when produced as a hot wrought or forged metal product from an oversize red hot slug of stock with at least a major percentage of the surplus metal of said stock pressed or driven into and included in the final product, constitutes specifically the preferred embodiment of my invention as presenting to a maximum degree the desirable characteristics, hereinbefore set forth, of capacity to deform to permanent bolt-locking formation combined with great strength and holding power against stripping.

In carrying out my method of producing this hot wrought or forged more or less ductile metal product, a red hot slug or blank from the heated steel or iron stock is driven into an annular metal die the bore of which corresponds in form and dimensions to the form and exterior perimeter dimensions of the final nut product, and this red hot blank or slug while in said die is then wrought or forged by and between oppositely and longitudinally moving forming plungers under very heavy pressure, to shape the back or inner end of the blank with its depending bearing ribs $b$, and also to shape the crown end of the blank with its flat face $c$, and intersecting diametrical groove $f$, causing the hot metal to flow in the new form with a rearranged molecular structure and materially increased density resulting in a product of the desired ductile characteristic. The original red hot slug or blank is of greater exterior dimensions than the forged blank, but the surplus metal resulting from the formation of the inner end and the groove $f$, is driven by the forging blows and pressure into and included in the forged blank with a resulting increase in strength and ductility particularly at the portions h.

The bolt hole in the blank can be punched either while the blank is hot and in the hollow die, or while the blank is cold after the completion of the forging step. The forged nut blank is screw threaded and its surfaces finished while cold.

I do not desire to limit my invention to the approximate disclosure hereof except where required by the following claims when construed in the light of the prior art, for it is clear to those skilled in the art that departures and modifications might be resorted to without departing from the spirit and scope of my invention.

What I claim is:

1. A forged metal nut having its screw threaded bolt hole of uniform diameter throughout its length for loose intermesh with the thread of its complementary bolt for free spinning on the bolt up to light contact with the hard surface against which the nut is to be rotatably forced to final seating, said nut characterized by capacity to permanently remain in the bolt-thread-gripping form to which bent when rotatably forced to its said final seat, said nut having a transverse central condensed relatively-thin bending portion formed by a relatively deep transverse groove across the nut crown and a relatively shallow transverse groove across the nut back, the metal displaced in the formation of said grooves being condensed into the nut including said portion.

2. A forged metal nut at its back providing off-center bearing portions to ride on the hard surface against which the nut takes its final seating, said nut having a relatively-thin hinge or bending portion possessing ductile characteristics on which said nut is capable of flexing to permanent bolt thread gripping form, said portion formed by a relatively deep transverse groove across the nut crown and a parallel shallow groove across the nut back, the metal displaced in the formation of said grooves being included in whole or in part in said portion.

3. In the production of a forged metal nut having its screw threaded bolt hole of uniform diameter throughout its length, and having a relatively thin central transverse hinge or bending portion on which the nut bends to permanent bolt thread gripping form by the act of forcibly rotating the nut to its final seat against a hard surface; that step which consists in forging a hot metal blank between opposing pressures to partially longitudinally reduce the nut, to drive the displaced metal into the nut and form said portion.

4. In the production of forged metal nuts for screw threaded bolts, that step which includes longitudinally forging a block of metal at forging temperature under high pressure to longitudinally condense the block and form therein from both ends a transverse bending portion of reduced thickness and condensing the displaced metal into said portion and the shaped block to render said portion, tense, tough, flexible and capable of permanently remaining in the form to which bent.

5. In the production of forged metal nuts for screw threaded bolts, capable of bending to permanent bolt thread gripping form; that step which consists in forging an oversize metal blank at forging temperature within an annular metal die, between opposing high pressure plungers, to the exterior dimensions and circumferential and end shapes of the finished nut, while condensing and displacing the hot metal along transverse portions of the block and driving the surplus and displaced metal into the block and forming the block with an intermediate condensed transverse relatively-thin bending portion.

6. A self locking nut characterized by its capacity of remaining permanently in the form to which bent, said nut being exteriorly formed to receive and to be rotated by a suitable tool, and having a longitudinal screw threaded bolt hole to receive and but loosely intermesh with the screw thread of its appropriate bolt, the inner end or back of said nut having elongated parallel depending transversely rounded bearing ribs bevelled off at their ends and arranged along diametrically opposite edge portions of said back, the approximately flat surface of said back between said ribs converging upwardly and inwardly from said ribs to a central diametrical bending line, the outer or crown end of said nut having a diametrical groove extending completely across the same parallel with said bending line.

7. A self locking nut of standard dimensions and strength, having a central screw threaded bolt hole and exterior flats, the crown of the nut having a narrow deep diametrical groove intersecting its end face and opening through the bolt hole and opposite exterior flats, the back of the nut being bevelled off at the corners and having parallel depending permanent bearing ribs with the face of the back between said ribs forming a wide shallow V shaped groove parallel with said crown groove, said nut composed of metal having ductile characteristics.

Signed at Chicago, county of Cook, State of Illinois, this 1st day of March, 1929.

HARLEY E. BURNS.